March 21, 1950 W. J. MECKOSKI ET AL 2,501,134
UNIVERSAL MACHINE TOOL
Filed July 20, 1944 4 Sheets-Sheet 1
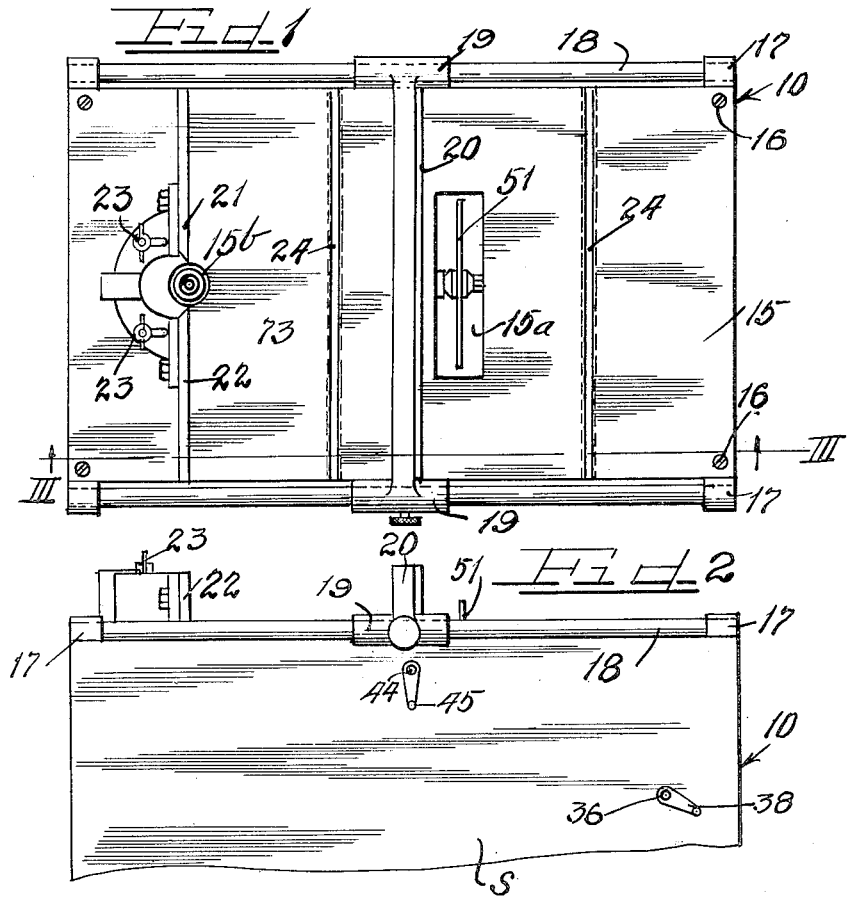
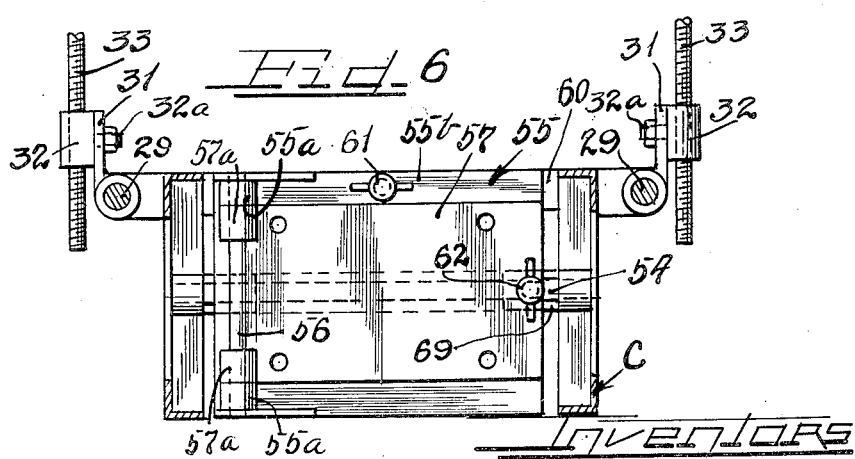
Inventors
Walter J. Meckoski
Joseph Snyder

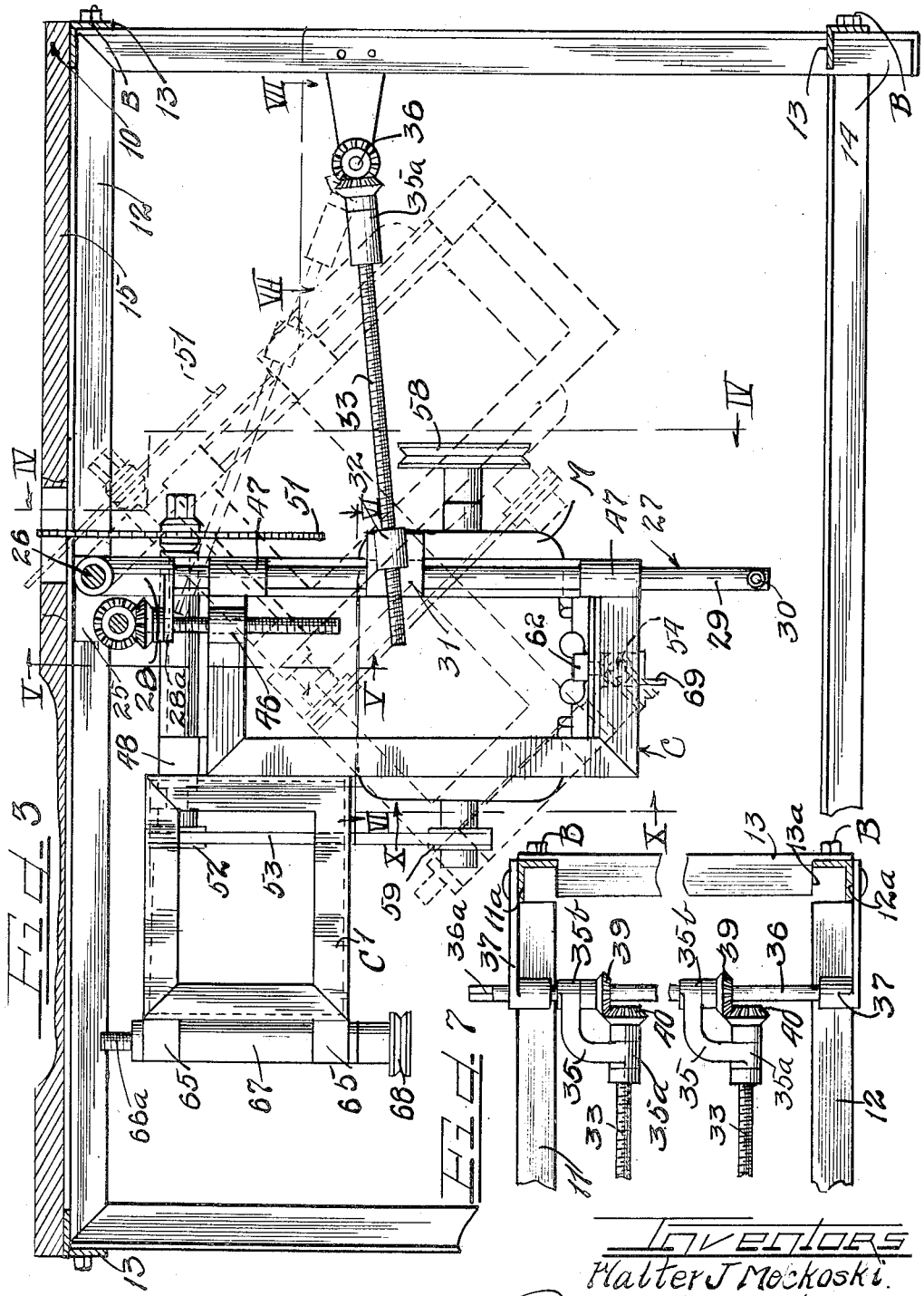

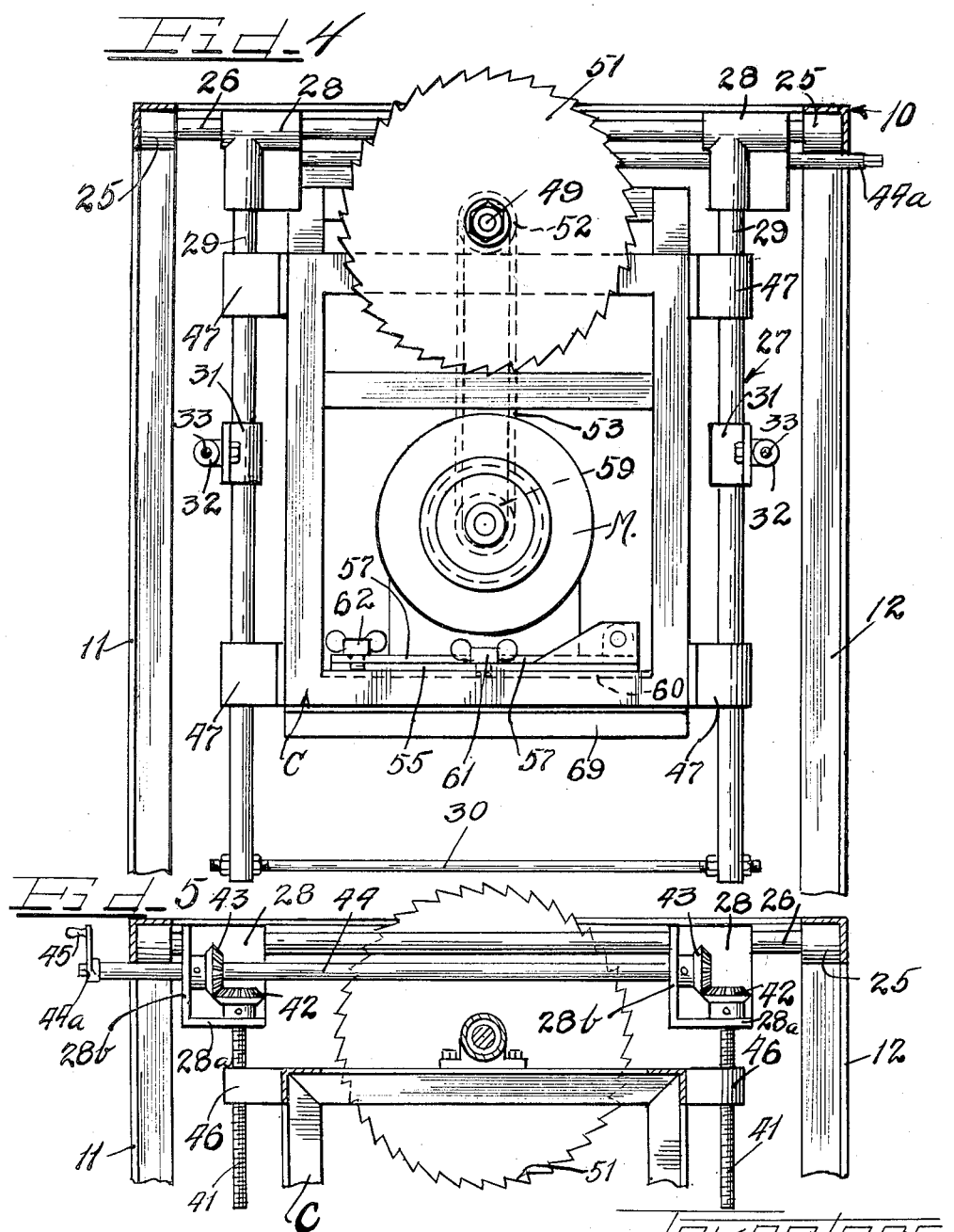

March 21, 1950 W. J. MECKOSKI ET AL 2,501,134
UNIVERSAL MACHINE TOOL
Filed July 20, 1944 4 Sheets-Sheet 4
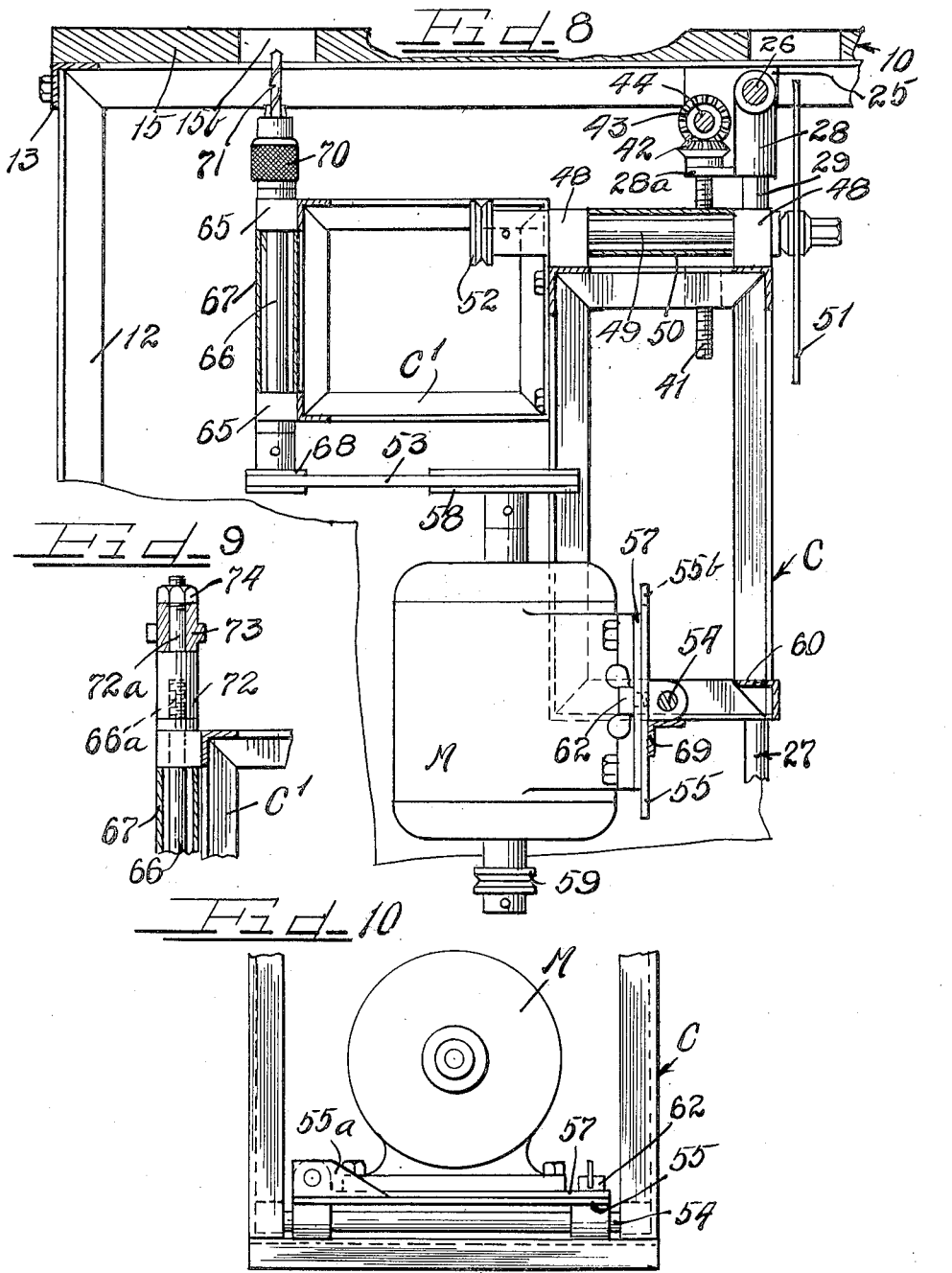
Inventors
Walter J. Meckoski
Joseph Snyder Patented Mar. 21, 1950

2,501,134

UNITED STATES PATENT OFFICE 2,501,134

UNIVERSAL MACHINE TOOL

Walter J. Meckoski and Joseph Snyder, Chicago, Ill.; said Snyder assignor to said Meckoski Application July 20, 1944, Serial No. 545,822

2 Claims. (Cl. 144—1)

This invention relates to a multiple machine tool driven from a single prime mover.

Specifically, the invention relates to a combination circular saw and shaper or drill press.

According to this invention a swingably mounted sub-frame is provided on a bench or table, and carries, in slidable relation thereon, a carriage supporting a prime mover and a pair of shafts in right angular relationship. One of the shafts is adapted to support a circular saw. The other shaft is adapted to support a shaper or drill. The carriage has a tiltable motor platform whereby the motor shaft can be positioned in planes normal to each other for selectively driving either the shaft for the circular saw, or the shaft for the shaper and drill bits. Screw rod devices are provided for tilting the swingable frame, and for raising and lowering the carriage on the swingable frame.

The tiltable frame makes possible the angling of the tools supported thereon, such as the circular saw, so that a fixed stationary table can be used and the saw can be tilted relatively to the table. The carriage is readily controlled on the swingable frame to position the tools at desired levels relatively to the table. The tiltable motor support makes possible the use of a single motor to drive shafts at right angles without the use of bevel gears or the like. A single belt can selectively connect the motor with each shaft.

It is, then, an object of this invention to provide a multiple machine tool having a plurality of tools mounted on the same carriage and having the carriage mounted on a tiltable frame.

A further object of the invention is to provide a combined circular saw and shaper or drill press driven from a single prime mover.

A further object of the invention is to provide an inexpensive machine tool adapted for home use and capable of sawing, drilling and cutting operations.

A further object of the invention is to provide an inexpensive knock-down combined circular saw and shaper.

A still further object of the invention is to provide a swingable frame and slidable carriage assembly for machine tools.

Another object of the invention is to provide an accurately adjustable carriage for rotatably supporting a circular saw shaft and a shaper shaft in right angular relationship.

A further object of the invention is to provide a multiple machine tool with a single motor which is readily shifted to selectively drive different tools on the machine.

Other and further objects of the invention will be apparent to those skilled in the art from the following detailed description of the annexed sheets of drawings which, by way of preferred example only, illustrate one embodiment of the invention.

On the drawings:

Figure 1 is a top plan view of the machine tool according to this invention.

Figure 2 is a fragmentary side elevational view of the machine tool shown in Figure 1.

Figure 3 is an enlarged fragmentary vertical cross-sectional view taken along the line III—III of Figure 1 and illustrating, in dotted lines, a tilted position of the tool carriage frame.

Figure 4 is a cross-sectional view, with parts in end elevation, taken along the line IV—IV of Figure 3.

Figure 5 is a vertical cross-sectional view, with parts in end elevation, taken along the line V—V of Figure 3.

Figure 6 is a horizontal cross-sectional view, with the motor omitted, taken along the line VI—VI of Figure 3.

Figure 7 is a broken fragmentary horizontal cross-sectional view taken along the line VII—VII of Figure 3.

Figure 8 is a view similar to Figure 3 but illustrating the motor in tilted position and driving the shaft for a drill bit.

Figure 9 is a fragmentary vertical cross-sectional view, with parts in elevation, illustrating a shaper tool bit mounted on the shaft carrying the drill of Figure 8.

Figure 10 is a fragmentary end elevational view taken along the line X—X of Figure 3.

As shown on the drawings:

The machine 10 of this invention includes rectangular front and rear side frames 11 and 12 (Figs. 4 and 5) fabricated from welded-together angle strips. These frames 11 and 12 are detachably connected to each other through four horizontal angle strips 13 bolted by bolts B to the top corners and bottom portions of the rectangular side frames as best shown in Figure 3. As also shown in Figure 3, the angle pieces forming the vertical portions of the side frame 12 preferably extend beneath the bottom horizontal leg of the frame to form legs such as 14. The top angle pieces 13 carry a flat table top 15 which is removably secured thereto by means of screws 16 (Figure 1).

The table top 15 has bosses 17 on the corners thereof projecting forwardly and rearwardly and supporting rods 18 on which are slidably mounted housings 19 carrying, across the top of the table, a saw fence or guide 20. The table top 15 also carries fences 21 and 22 secured thereto by means of wing nut assemblies 23. Miter grooves 24 are also provided in spaced parallel relation across the top of the table 15.

A rectangular aperture 15a is formed through the table between the miter grooves 24 while a circular aperture 15b is formed through the table in spaced relation from the aperture 15a and between a miter groove 24 and an end of the table.

The top angle pieces for the front and rear side frames 11 and 12 have blocks 25 welded thereto within the angles thereof and these blocks 25 support a heavy cross shaft 26 as best shown in Figures 3 to 5. A sub-frame indicated generally by the reference numeral 27 is swingably mounted on this cross shaft 26 and carries a carriage C in slidable relation thereon. The sub-frame 27 includes coupling members 28 having vertical recesses in right angular relationship with horizontal recesses receiving the shaft 26 therethrough, and with the vertical recesses carrying the upper ends of shafts 29. The lower ends of the shafts 29 are connected by a cross rod 30.

As best shown in Figures 3, 4 and 6, the shafts 29 have brackets 31 clamped thereon intermediate the ends thereof carrying swingable internally threaded bosses 32 receiving, in threaded relation therein, screw rods 33. The screw rods 33, as best shown in Figure 7, are rotatably mounted in the bosses 35a of brackets 35 having other bosses 35b receiving a shaft 36 therethrough. This shaft 36 extends between the front and rear side frames 11 and 12 and is rotatably mounted in brackets 37 secured to uprights 11a and 12a of these frames. As also shown in Figure 7, the cross strip 13 connecting the front and rear frames 11 and 12 is cut away at the ends 13a thereof to provide a flange for overlying the frame parts 11a and 12a so that the bolts B can readily detachably connect strips such as 13, 13 to the frames.

The shaft 36 projects through the front bracket 37 and has a square end 36a adapted to receive a crank arm 38 as best shown in Figure 2.

Bevel gears 39 are secured on the shaft 36 adjacent the bracket bosses 35b and mesh with bevel gears 40 on the ends of the screw rods 33. Rotation of the shaft 36 will thereby rotate both screw rods 33 to swing the frame 27 and the carriage C thereon as indicated in dotted lines in Figure 3. Brackets 35 swing to permit angulation of the screw rods 33. Likewise, the threaded members 32 on the brackets 31 are swivelly mounted on studs 32a as shown in Figure 6 to permit this swinging movement.

As best shown in Figures 3, 5 and 8, the couplings 28 have horizontal flanges 28a thereon receiving screw rods 41 therethrough. These screw rods 41 have bevel gears 42 secured on their upper ends meshing with bevel gears 43 secured on a shaft 44 which is rotatably supported in vertical flanges 28b of the couplings 28. The shaft 44 projects beyond the front frame 11 and has a square end 44a for receiving a crank arm 45 thereon. Rotation of the shaft 44 will rotate both screw rods 41. These screw rods 41 are threaded through bosses 46 on the sides of the carriage C which is of open, rectangular box-like construction formed from angle strips. The one end face of this box-like construction has forwardly and rearwardly projecting sleeves 47 at the four corners thereof slidably mounted on the shafts 29. The threaded brackets or sleeves 46 are secured to the top members of the box construction and, when the shaft 44 is rotated to drive the screws 41, the carriage C will be raised or lowered on the sub-frame 27 since the sleeves 47 will slide on the shafts 29 of this sub-frame.

The carriage C carries, on the top thereof, bearing blocks 48 rotatably supporting a shaft 49. A sleeve 50 (Fig. 8) encases the shaft between the bearing blocks 48. The shaft projects beyond both ends of the carriage C and is adapted to receive a circular saw 51 on one end thereof for projecting through the slot 15a of the table 15 together with a pulley 52 on the other end thereof for receiving a driving belt 53. The bottom of the box-like carriage C carries a shaft 54 extending in a front to rear direction and tiltably supporting a platform 55. This platform 55 has upstanding bosses 55a (Fig. 6) at one end thereof supporting a shaft 56 at right angles to the shaft 54. The shaft 56 receives bosses 57a of a motor platform 57 therethrough to tiltably carry the motor platform on the tiltable platform 55. The motor platform 57 can therefore tilt on the shaft 56 at one end thereof while the platform 55 can tilt on the shaft 54 relative to the carriage C.

A motor M is bolted on the platform 57 and has a drive shaft extending from both ends thereof equipped with pulleys 58 and 59 (Fig. 8) on said extended ends.

When the platform 55 is disposed in horizontal relation, it has an end 55b overlying an angle piece 60 of the carriage C as indicated in Figures 6 and 8. A wing bolt 61 (Figs. 4 and 6) threaded into this angle piece 60 secures the platform 55 in fixed position on the carriage.

A wing bolt 62 is provided through the end of the platform 57 remote from the shaft 56 and can be threaded into the platform 55 to control the tilting of the platform 57 and its spaced relation from the platform 55 for the purpose of tightening the belt 53.

As shown in Figures 3 and 4, the pulley 59 drives the belt 53 to drive the pulley 52 for rotating the shaft 49 to drive the saw 51. The motor M is in horizontal position with the platform 55 locked to the angle piece 60 by the wing bolt 61.

The carriage C has a sub-carriage C' of similar box-like construction bolted to the upper side thereof remote from the shafts 29. This sub-carriage C' has bearing blocks 65 on the vertical side thereof remote from the carriage C, which blocks rotatably support a shaft 66 (Figs. 8 and 9) normal to the shaft 49. The shaft 66 is preferably covered between the blocks 65 with a sleeve 67. The shaft 66 projects beyond the ends of the blocks 65 and receives a pulley 68 on one end thereof adapted to be driven by the belt 53 from the pulley 58 of the motor M when the motor is in vertical position as shown in Figure 8. In this position, the motor platform 55 is held against further tilting by an angle piece 69 of the carriage C. As shown in Figure 8, this angle piece is beneath the shaft 54 which tiltably supports the platform 55. The belt 53 pulls the top portion of the motor toward the shaft 66 so that motor platform 55 is held tightly against the angle piece 69.

The other end of the shaft 66 carries a chuck 70 which, as shown in Figure 8, removably receives a drill bit 71 adapted to project through the opening 15b of the table top 15.

As shown in Figure 9, the chuck 70 on the shaft 66 can be replaced with a carrier 72 for a shaper bit 73. The carrier 72 has an internally threaded bore receiving the threaded upper end 66a of the shaft to secure the carrier 72 to the shaft for corotation. The chuck 70 is similarly secured to the shaft 66. The upper end of the carrier 72 has a spindle portion 72ª around which the shaper 73 is seated. A nut 74 locks the shaper in position.

From the above descriptions it will be understood that the main frame of the machine is composed of front and rear side rectangular frame pieces. These rectangular frame pieces are detachably secured together by angle strips 13 bolted to the rectangular frame pieces by means of bolts B. The angle pieces 13 have cut out end portions 13a so that their flanges can overlie the side frames 11 and 12 as indicated in Figure 7. The bottom angle pieces 13 and the bottom strips of the rectangular side frames are preferably spaced above the ends of the vertical strips as indicated in Figure 3 to provide legs 14 for the main frame. The connected side frames carry a removable table top 15 and side covering sheets such as S (Figure 2) to enclose the swinging frame mechanism.

The main frame supports a swingable frame 27 which can be swung by means of screw rods 33. These screw rods are operated by rotation of a control shaft 36.

The swinging frame 27 slidably supports a main carriage C. This main carriage rotatably carries a shaft for a circular saw 51. The main carriage is raised and lowered by means of screw rods 41 which are operated by rotation of a shaft 44. The circular saw 51 projects through an opening 15a in the top of the table 15 for the main frame any desired amount depending upon the setting of the carriage. Likewise, the circular saw can be tilted to any desired angle by swinging of the subframe 27. The table top 15 is removable from the main frame.

The main carriage C carries an electric motor on a tilting platform so that the motor can be swung from horizontal position illustrated in Figure 3 for driving the circular saw 51, to a vertical position illustrated in Figure 8 for driving the shaper or drill bit. The shaper or drill bit is mounted on a shaft carried by a sub-carriage C' which is secured on the main carriage C. The same mechanism that raises and tilts the saw 51 also raises and tilts the drill bit or shaper.

The electric motor M has a single shaft driving separate pulleys at opposite ends thereof. These pulleys drive the same belt to selectively drive either the saw, or the drill or shaper.

The invention thus provides a simple, inexpensive universal machine tool including driving mechanism for a circular saw and driving mechanism for other tools such as drill bits, shapers, and the like. The entire machine of this invention can be readily disassembled since its main frame is composed of detachable front and rear side frames. This disassembly feature of the invention makes it possible to take the machine apart for transportation, and also decreases shipping costs.

It will, of course, be understood that various details of construction may be varied through a wide range without departing from the principles of this invention and it is, therefore, not the purpose to limit the patent granted hereon otherwise than necessitated by the scope of the appended claims.

We claim as our invention:

1. A machine tool comprising a main frame, a subframe pivoted thereto to swing, brackets on said subframe and carrying threaded members, screw rods threaded in said members and supported by said main frame, means for rotating said rods to swing said subframe, a carriage slidable on said subframe, a cross-shaft journaled in said subframe, screw rods threaded into said carriage and rotatable by said cross-shaft to move said carriage on said subframe, a first shaft journaled in said carriage, a second shaft journaled in said carriage with its axis at 90° to the first shaft, and a motor pivotally supported on said carriage to swing to one position for belted connection to said first shaft and to swing to another position for belted connection to said second shaft.

2. A machine tool comprising a main frame, a subframe pivoted thereto to swing on a horizontal axis, means for swinging said subframe, a carriage slidable on said subframe, means for sliding said carriage, a first tool shaft journaled in said carriage, a second tool shaft journaled in said carriage with its axis at 90° to the axis of said first shaft, a plate hinged to said carriage to be swung on a horizontal pivot from horizontal to vertical position, a shaft-equipped motor carried by said plate and movable with it, pulleys on said tool shafts and the shaft of said motor, said motor being adapted for belt connection to one of said tool shafts when said plate is in horizontal position and adapted for belt connection to the other of said tool shafts when said plate is in a vertical position, means for swinging said subframe comprising an internally threaded sleeve, a threaded rod engaging said sleeve, a shaft journaled in said main frame, meshed bevelled gears disposed respectively on said shaft and on said rod, and a bracket rotatably engaging said shaft and said rod to hold them in fixed relative position.

WALTER J. MECKOSKI.
JOSEPH SNYDER.

REFERENCES CITED

The following references are of record in the file of this patent:

UNITED STATES PATENTS

| Number | Name | Date |
|---|---|---|
| 100,704 | Bashore | Mar. 8, 1870 |
| 1,063,210 | Parks | June 3, 1913 |
| 1,088,451 | Rilance | Feb. 24, 1914 |
| 1,346,031 | Josias | July 6, 1920 |
| 1,593,317 | Thomes | July 20, 1926 |
| 1,608,037 | Rochon | Nov. 23, 1926 |
| 1,796,697 | White | Mar. 17, 1931 |
| 1,816,069 | Bennett | July 28, 1931 |
| 1,825,104 | Staeheli | Sept. 29, 1931 |
| 1,942,834 | Railley | Jan. 9, 1934 |
| 2,089,074 | Sharp | Aug. 3, 1937 |
| 2,127,745 | Lochman | Aug. 23, 1938 |
| 2,157,241 | Manning | May 9, 1939 |
| 2,200,799 | Miller | May 14, 1940 |
| 2,261,696 | Ocenasek | Nov. 4, 1941 |
| 2,299,262 | Uremovich | Oct. 20, 1942 |
| 2,323,248 | Sellmeyer | June 29, 1943 |
| 2,342,459 | Dushane | Feb. 22, 1944 |

FOREIGN PATENTS

| Number | Country | Date |
|---|---|---|
| 104,246 | Australia | June 14, 1938 |